United States Patent
Patwardhan et al.

(10) Patent No.: US 10,152,487 B1
(45) Date of Patent: Dec. 11, 2018

(54) SYSTEM AND METHOD FOR A CLOUD STORAGE PROVIDER TO SAFELY DEDUPLICATE ENCRYPTED BACKUP OBJECTS

(71) Applicant: EMC IP Holding Company LLC, Hopkinton, MA (US)

(72) Inventors: Kedar Shrikrishna Patwardhan, Pune (IN); Scott Ogata, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 710 days.

(21) Appl. No.: 14/500,394

(22) Filed: Sep. 29, 2014

(51) Int. Cl.
  G06F 21/62 (2013.01)
  G06F 17/30 (2006.01)
  H04L 29/06 (2006.01)

(52) U.S. Cl.
  CPC .... G06F 17/30156 (2013.01); G06F 21/6272 (2013.01); H04L 63/00 (2013.01)

(58) Field of Classification Search
  None
  See application file for complete search history.

(56) References Cited

U.S. PATENT DOCUMENTS

| | | | | |
|---|---|---|---|---|
| 8,495,392 B1 * | 7/2013 | Bardale | ............... | G06F 13/28 711/117 |
| 8,836,548 B1 * | 9/2014 | Chandra | ............... | H03M 7/607 341/50 |
| 9,037,856 B2 * | 5/2015 | Bestler | ............... | H04L 9/0863 713/167 |
| 9,195,851 B1 * | 11/2015 | Chandra | ............... | H04L 9/0894 |
| 9,396,341 B1 * | 7/2016 | Chandra | ............... | G06F 21/602 |
| 9,602,283 B1 * | 3/2017 | Chandra | ............... | G06F 21/602 |
| 9,792,421 B1 * | 10/2017 | Weber | ............... | G06F 21/32 |
| 2012/0166818 A1 * | 6/2012 | Orsini | ............... | H04L 9/085 713/193 |
| 2013/0097380 A1 * | 4/2013 | Colgrove | ............... | G06F 17/30159 711/118 |
| 2014/0281545 A1 * | 9/2014 | Erofeev | ............... | G06F 21/6218 713/171 |
| 2015/0101065 A1 * | 4/2015 | Sullivan | ............... | G06F 21/6245 726/28 |
| 2015/0347444 A1 * | 12/2015 | Jalon | ............... | G06F 17/30044 707/692 |

* cited by examiner

Primary Examiner — Ashish Thomas
Assistant Examiner — Mellissa M. Ohba
(74) Attorney, Agent, or Firm — Staniford Tomita LLP

(57) ABSTRACT

A cloud storage system stores data objects from different customers. Each customer has their own encryption key to encrypt the data objects for storage and the key is not shared. To deduplicate the data objects, a set of base fingerprints associated with a set of base data objects is stored. A first fingerprint associated with a data object from a customer is compared with a base fingerprint. The first and base fingerprints are generated by applying an identical fingerprinting algorithm to unencrypted versions of the data objects. If the fingerprints match, the first fingerprint is associated with a base data object corresponding to the matching base fingerprint, and the data object from the customer is not stored. If the fingerprints do not match, the data object from the customer is stored.

17 Claims, 11 Drawing Sheets

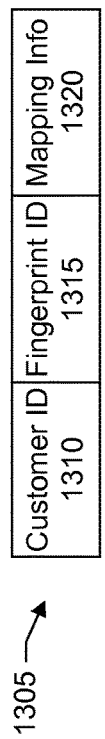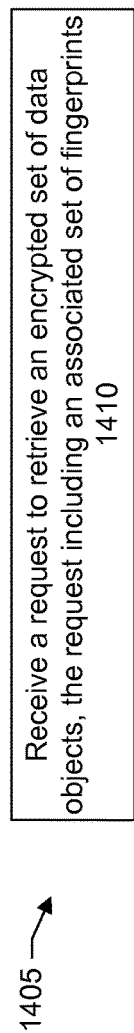

SYSTEM AND METHOD FOR A CLOUD STORAGE PROVIDER TO SAFELY DEDUPLICATE ENCRYPTED BACKUP OBJECTS

BACKGROUND

The present invention relates generally to the field of information technology, and, more particularly, to systems and techniques for deduplication.

Companies are increasingly turning to cloud storage for their data storage needs. Storing data in the cloud helps companies to lower expenses by, for example, reducing the need to maintain physical servers and other hardware resources. Similarly, cloud storage vendors are continuously seeking new ways to reduce their costs. Eliminating redundant data is one way a cloud storage vendor can reduce costs. Eliminating redundant data can significantly shrink storage requirements and improve bandwidth efficiency. Removing redundant data lowers storage costs as fewer disks are needed. Removing redundant data also helps to conserve electricity to power and cool the disks or tape drives.

Deduplication is a process for removing redundant data. In particular, if two objects are duplicates of each other, then only one of the objects needs to be stored. Thus, the amount of data to be stored can be reduced. Eliminating redundant data in a cloud environment, however, is difficult because the data is often encrypted by the customer of the cloud storage vendor for security purposes. Thus, a vendor's cloud storage system may include many redundant data objects across its customers, but which appear to be different because of the encryption. It can be desirable to reduce the amount of redundant data that is stored in order to reduce the computing costs for the vendor. Such cost savings may be passed to the customers of the cloud storage vendor.

Thus, there is a need to provide systems and techniques for facilitating the deduplication of encrypted data.

BRIEF DESCRIPTION OF THE FIGURES

FIG. 13 shows an example of an entry that may be made in a table to track the data objects in a specific embodiment.

FIG. 14 shows an example of a flow diagram for retrieving the deduplicated encrypted data objects in a specific embodiment.

DETAILED DESCRIPTION

Figure 1:
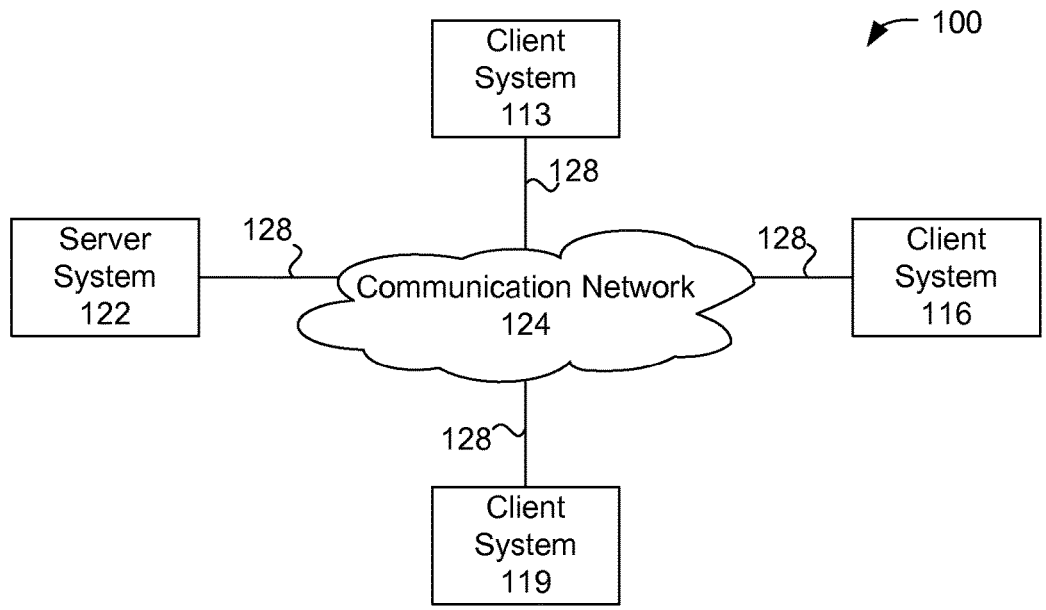
FIG. 1 shows a block diagram of a client-server system and network in which an embodiment of the system may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

Figure 2:
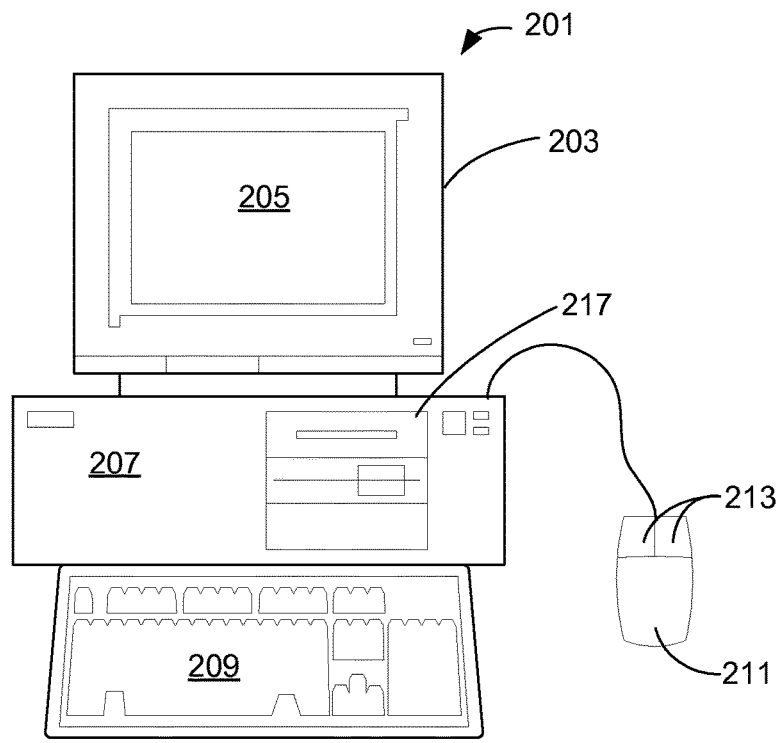
FIG. 2 shows a more detailed diagram of an example of a client or computer which may be used in an embodiment of the system.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
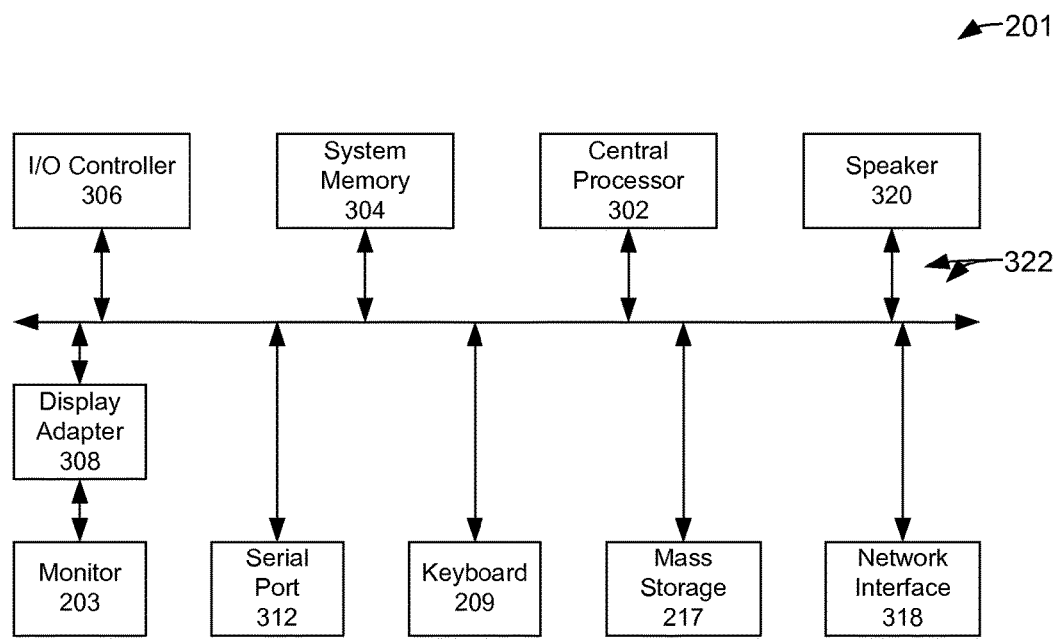
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
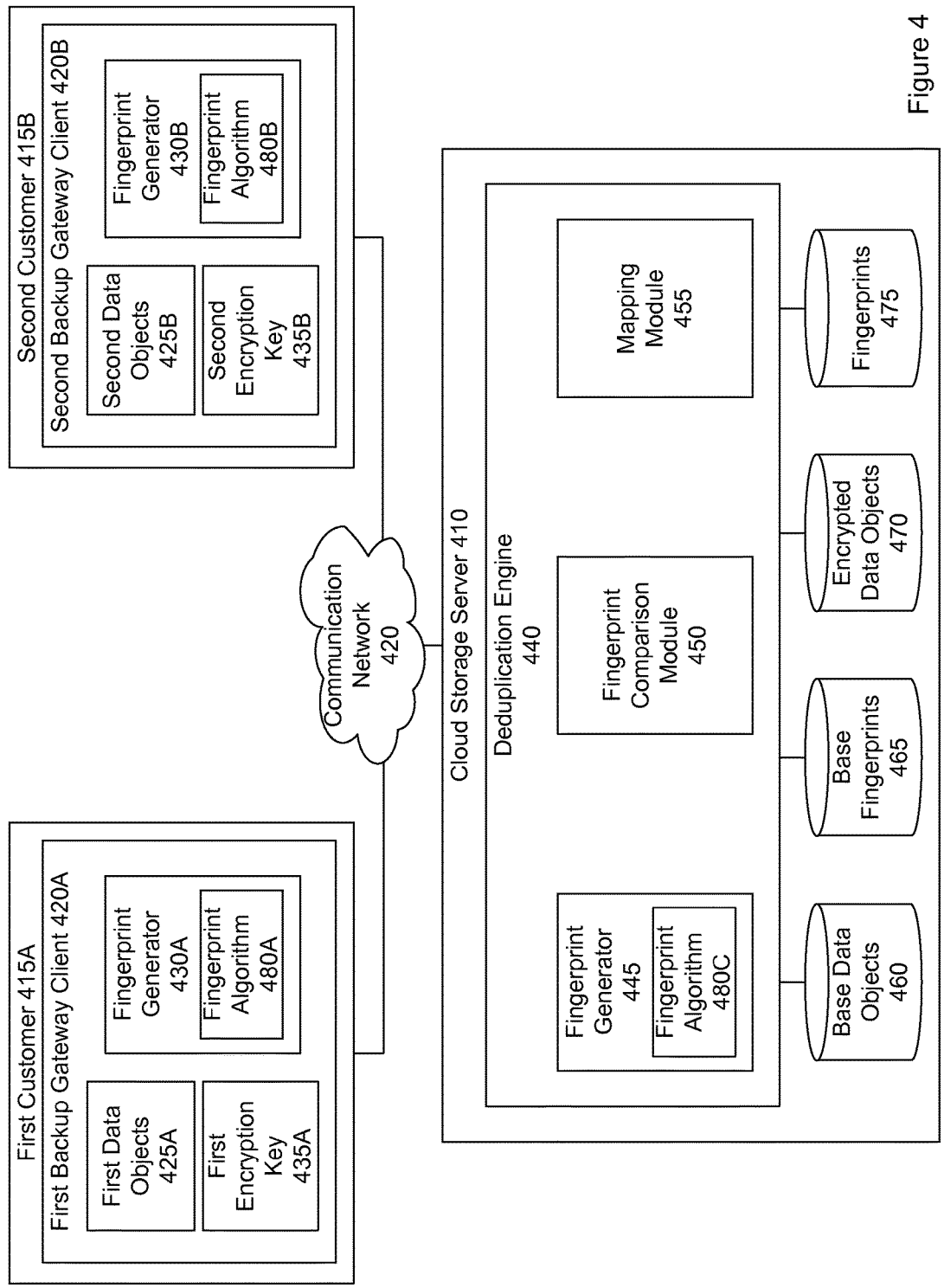
FIG. 4 shows an overall architecture of a system for deduplicating encrypted data objects in a specific embodiment.

FIG. 4 shows an overall architecture of a system for deduplicating encrypted data objects in a cloud computing environment. As shown in FIG. 4, there is a cloud storage server system 410 provided by a cloud services provider. The cloud services provider has customers such as first and second customers 415A and 415B, respectively, that access, via a communication network 420, services (e.g., cloud storage services) provided by the cloud services provider.

For example, a cloud services provider such as a cloud storage vendor can offer cloud storage as an extended retention for customer backups. A specific example of a cloud storage platform is EMC Atmos, developed by EMC Corporation. Atmos can be deployed as either a hardware appliance or as software in a virtual environment. The Atmos technology uses an object storage architecture designed to manage petabytes of information and billions of objects across multiple geographic locations as a single system. In another specific embodiment, the cloud storage may be implemented as an S3-based object service where data is stored in the cloud as objects. Each object can include the data itself, a variable amount of metadata, and a globally unique identifier. S3 refers to an online file storage web service offered by Amazon Web Services.

It should be appreciated, however, that the deduplication techniques described in this patent application can be applied to other object-based storage architectures. Further, in other specific embodiments, aspects of the techniques can be applied to storage architectures such as file systems which manage data as a file hierarchy and block storage which manage data as blocks within sectors and tracks.

Data stored in the cloud may be generated by the customers (or via the backup gateway clients), which use the cloud storage as extended retention for backups. In a specific embodiment, these backup gateway clients encrypt all data stored in the cloud storage for reasons related to privacy and security. The encryption key is often private to the customer and the cloud storage provider cannot in any way decrypt or extract the content of the data stored in the objects created by customers.

Cloud storage providers can benefit significantly if the data objects stored by their customers can be deduplicated. Existing methods to deduplicate objects in the cloud require that the decryption key be shared with the cloud storage provider or require that customers themselves deduplicate their data as it gets stored in the cloud.

In other words, existing solutions require that customers deduplicate their own objects within the confines of their own data stored in the cloud or require that customer share decryption keys of their encrypted data with the cloud storage provider. Regardless, the cloud storage vendor cannot deduplicate objects stored in the cloud across all of its customers. Thus, while one customer may be storing only data objects unique to them, there may be another customer having data objects that are identical to the data objects of that one customer.

In a specific embodiment, systems and techniques are provided to deduplicate backup data objects even as customers use secret keys to encrypt the data objects uploaded by the backup gateway client. The systems and techniques allow for deduplicating without ever decrypting, objects across the entire customer-created object set, such that only publicly known data (e.g., data not uniquely generated or attributable to customers of the cloud storage) is deduplicated. Often, backups may contain data that can be classified as operating system files/images, configuration data files, application binary files, or combinations of these which are in part or entirely duplicated across backups of several customers.

In a specific embodiment, a cloud gateway client stores backup data into a cloud storage. Multiple customers deploy the gateway client to store backup data into the cloud. The gateway client software encrypts the data with a key that is private to each customer. The gateway client and the cloud storage provider implement methods as described herein to deduplicate encrypted objects across the entire customer base or a subset of the customer base of the cloud storage provider. A result can include the deduplication in-part or entirety, of backup data that belongs to operating system files/images, configuration data files, or application binaries across backups of several customers (e.g., two or more customers).

Referring now to FIG. 4, there is a first client 420A that belongs to the first customer, and a second client 420B that belongs to the second customer, different from the first customer. For example, the customers can be separate and distinct organizations or companies (e.g., Coca Cola and Pepsi). Each customer may have their own network domain that is different from the network domain of another customer. A client may be referred to as a backup gateway client. The client can be a general purpose computer with hardware and software such as shown in FIGS. 2-3 and described above. For example, the client may include a processor, memory, and storage. The server or cloud storage server system includes components similar to the components shown in FIG. 3 and described above. For example, the server may include memory, applications, and storage. The communication network is as shown in FIG. 1 and described above.

The first client includes a first set of data objects 425A to be encrypted and backed up to the cloud storage server, a fingerprint generator 430A, and a first encryption key 435A. Similarly, the second client includes a second set of data objects 425B to be encrypted and backed up to the cloud storage server, a fingerprint generator 430B, and a second encryption key 435B.

A data object may be referred to as a chunk or unit. A data object or chunk may be include a portion of a file. In particular, a file, image, or disk image may be divided into a series, sequence, or any number of data objects or chunks. A data object or chunk can be a portion of an operating system file, device driver, configuration data file, application program, application binary, email (e.g., Microsoft Outlook Personal Folder File), database, text file, application data, document (e.g., Microsoft Word document, Excel spreadsheet, or PowerPoint presentation, or Adobe PDF file), Web page, audio file, video file, or image file, among others. Thus, a data object may include public, generic, or non-customer-specific data such a device driver. Alternatively, a data object may include customer-specific data such as the details of a marketing campaign, results of a research and development project, financial results, and so forth.

The fingerprint generator is responsible for generating a fingerprint of a data object. For example, fingerprint generator 430A accepts as input a data object. The fingerprint generator applies a fingerprint algorithm or function 480A to output a fingerprint of the data object. The fingerprinting can map an arbitrary data object to a shorter bit string, e.g., its fingerprint, that uniquely identifies the original data object. A fingerprint function is a type of hash function that can be used to uniquely identify a block of data. The fingerprint generator may apply any competent fingerprinting algorithm. One example of a fingerprinting algorithm that may be applied is the Rabin algorithm or Rabin-Karp algorithm, or other similar method.

In a specific embodiment, the data objects are encrypted for backup to the cloud storage system by the client with the respective encryption key. After the data objects are encrypted, the client transmits the encrypted data objects to the server for storage or backup. The data objects remain encrypted at the server. The data objects are not decrypted at the server. The data objects remain in an encrypted format at the server.

In this specific embodiment, the encryption key is stored on the client system. The encryption key is managed by the customer—and not by the cloud services vendor. For example, the encryption key is not stored at the cloud server. The encryption key is not available to the cloud services vendor, and is not shared with the cloud services vendor. The encryption key is not accessible by the cloud services vendor, nor is it transmitted to the cloud server. Thus, the cloud server does not receive the encryption key. This helps to ensure that only the customer (who has the encryption key) can decrypt the encrypted data object. That is, in this specific embodiment, each customer has their own encryption key to encrypt their data. For example, the first encryption key of the first customer is different from the second encryption key of the second customer.

Figure 5:
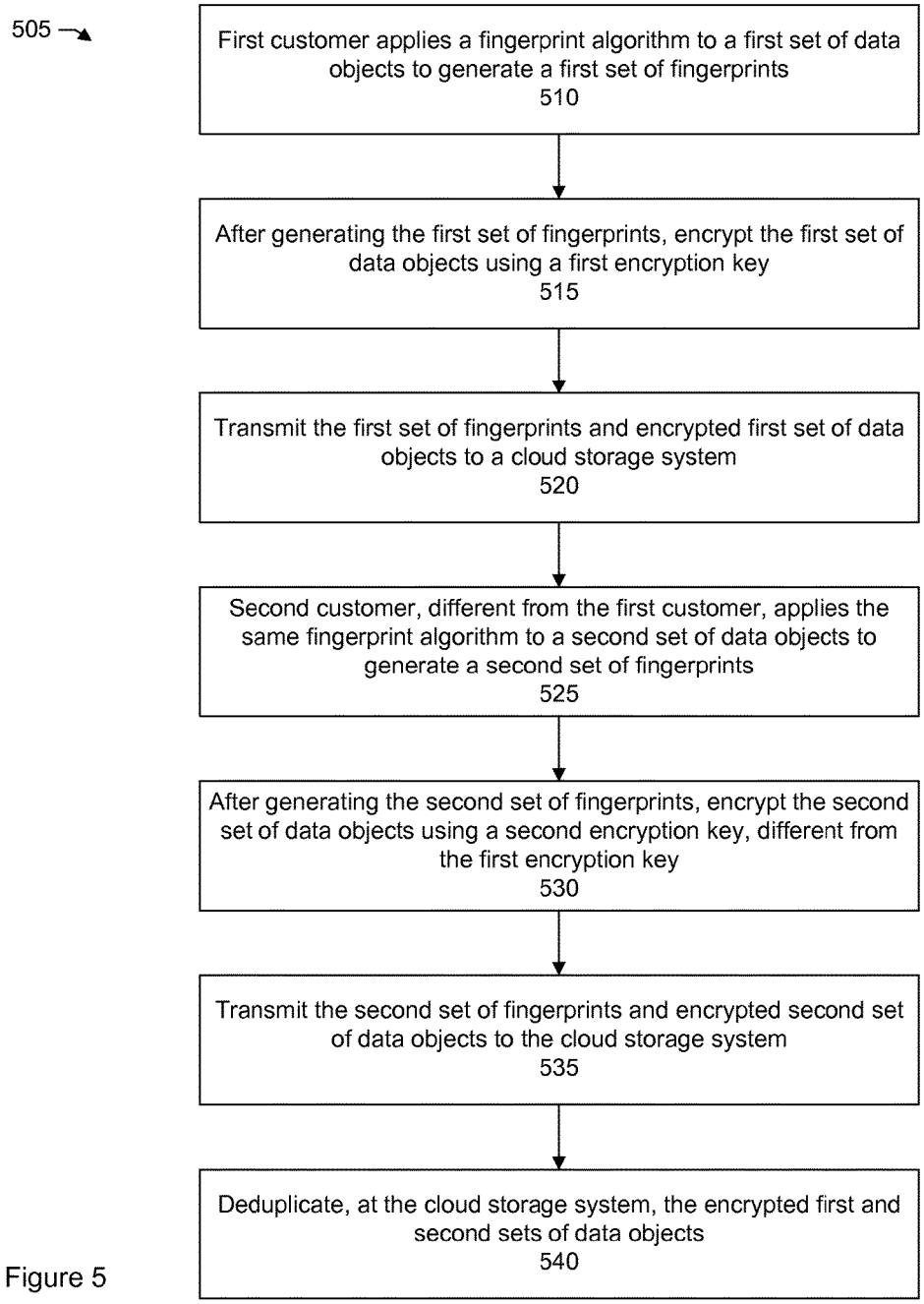
FIG. 5 shows a flow diagram for transmitting encrypted data objects to the cloud for deduplication in a specific embodiment.

FIG. 5 shows a flow diagram 505 of a specific embodiment for backing up encrypted data objects to a cloud server where they will be deduplicated. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Figure 6:
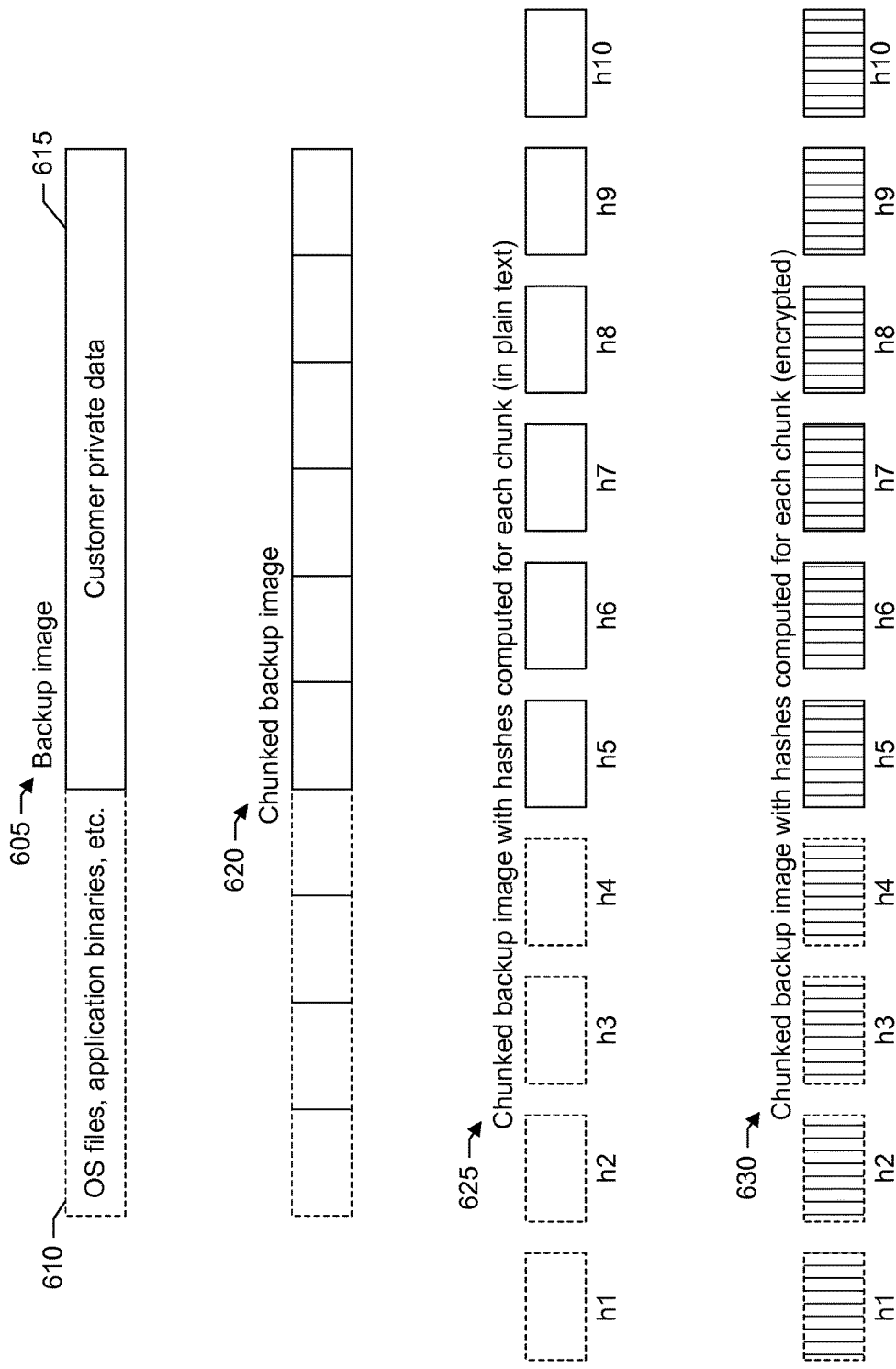
FIG. 6 shows an example of a backup image in a specific embodiment.

In a step 510, the first customer applies a fingerprint algorithm to a first set of data objects to generate a first set of fingerprints. For example, FIG. 6 shows a schematic of a backup image 605. The image can be within a Windows environment or other operating system environment. A backup of each customer server may be stored on the cloud. A backup image can be a very large file such as on the order of 100s of megabytes. Before storing it in the cloud, the image may be chunked (broken into smaller pieces) and deduplicated (e.g., deduplicated against the customer's own data). A backup can contain files belonging to an operating system, application binary data, and, customer-specific data.

For example, a first portion 610 of the image includes operating system files, application binary files, and so forth. A second portion 615 of the image includes customer private data. The backup image may be chunked or divided into smaller pieces or data objects 620 for uploading to the cloud storage server. Chunking helps to increase the efficiency of the upload process. In particular, if there is a failure during the transmission, the transmission can resume from the last successful chunk rather than having to restart with the very first byte of the backup image. The size of a chunk may range from about 1 byte to about 64 kilobytes (KB), but generally averages about 8 KB or 24 KB.

A set of fingerprints or hashes 625 (e.g., h1-h10) is generated for the set of data objects or chunks. The fingerprint or hash is generated by applying the fingerprint or hash function to the unencrypted version of the data object or chunk.

In a step 515 (FIG. 5), after the first set of fingerprints have been generated, a first encryption key is used to encrypt the first set of data objects, resulting in an encrypted first set of data objects or chunks 630 (FIG. 6). As shown in FIG. 6, a pattern of vertical lines are used to indicate the data objects or chunks having been encrypted. As discussed above, the fingerprints are generated based on unencrypted versions of the data objects. The fingerprints are generated when the data objects are in an unencrypted format. The fingerprints are generated before the data objects are encrypted.

In a step 520 (FIG. 5), the first set of fingerprints and encrypted first set of data objects are transmitted, sent, or streamed from the client to the cloud storage system. In a step 525, the second customer, different from the first customer, applies the same or an identical fingerprint algorithm as the first customer to a second set of data objects to generate a second set of fingerprints. In other words, a fingerprint algorithm 480B (FIG. 4) used by the second customer will be the same as, identical to, or a copy of fingerprint algorithm 480A used by the first customer.

In a step 530 (FIG. 5), after the second set of fingerprints have been generated, a second encryption key, different from the first encryption key, is used to encrypt the second set of data objects, resulting in an encrypted second set of data objects or chunks.

Figure 7:
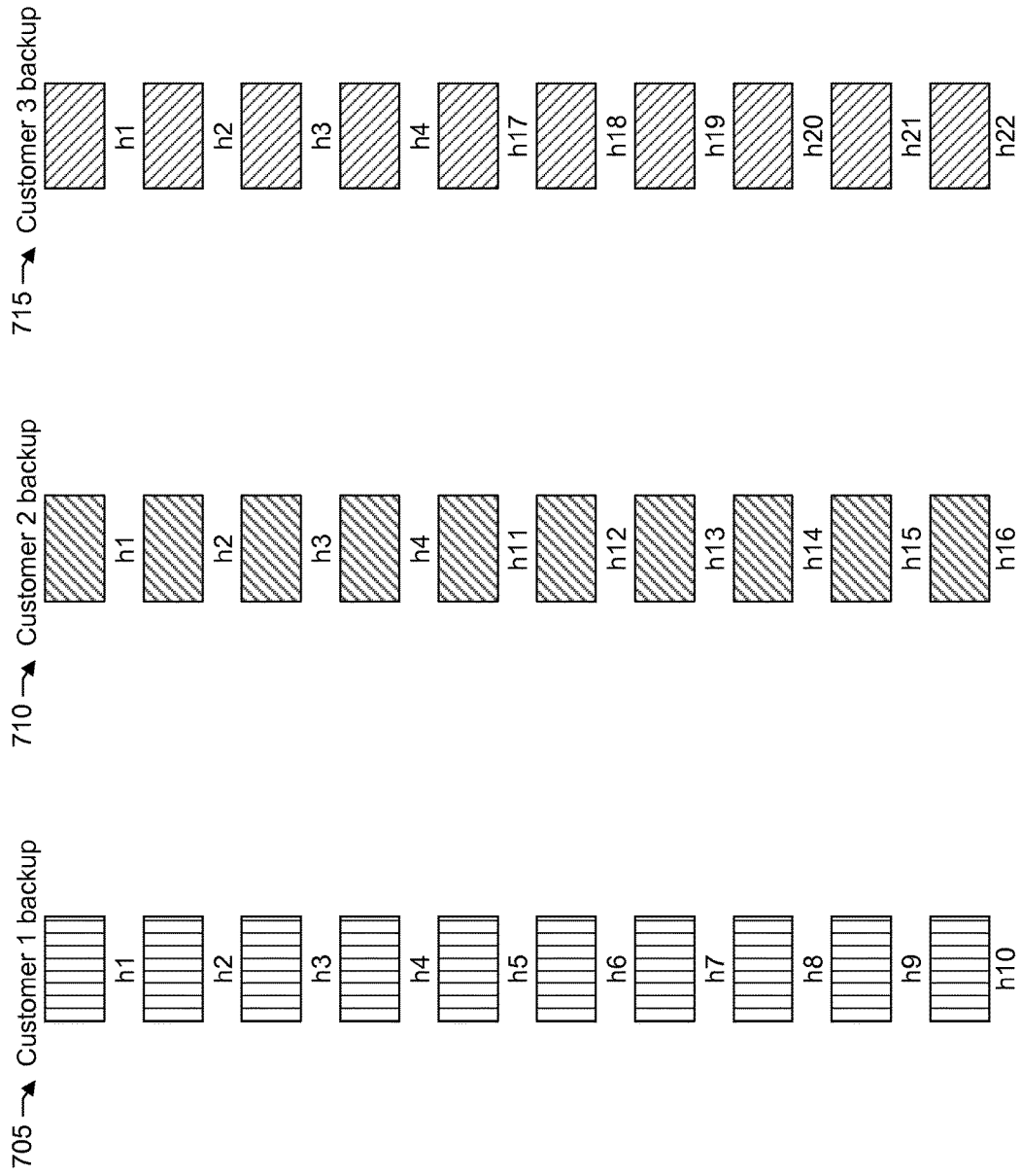
FIG. 7 shows an example of backup images of multiple customers in a specific embodiment.

For example, FIG. 7 shows a set of data objects or chunks from three customers (customers 1, 2, and 3). An encrypted first set of data objects 705 is from a first customer. An encrypted second set of data objects 710 is from a second customer. An encrypted third set of data objects 715 is from a third customer.

In the figure, different patterns of lines are used to illustrate different encryption keys being used to encrypt the data objects. For example, the encrypted first set of data objects is shown with a pattern of vertical lines to indicate that the data has been encrypted using the first encryption key. The encrypted second set of data objects is shown with a pattern of diagonal lines that slant to the right to indicate that the data has been encrypted using the second encryption key, different from the first encryption key. The encrypted third set of data objects is shown with a pattern of diagonal lines that slant to the left to indicate that the data has been encrypted using a third encryption key, different from the first and second encryption keys.

In a step 535, the second set of fingerprints and encrypted second set of data objects (and third set of fingerprints and encrypted third set of data objects) are transmitted to the cloud storage system. In a step 540, the encrypted data objects are deduplicated at the cloud storage system. The encrypted data objects can be deduplicated without decrypting the encrypted data objects. The encrypted data object can remain in an encrypted format during the deduplication.

More particularly, referring now to FIG. 4, in a specific embodiment, the cloud storage system includes a deduplication engine 440. Although the deduplication engine is shown within the cloud server, it should be appreciated that the deduplication engine can execute within an appliance separate from the server. The appliance may be a hardware appliance or software appliance (e.g., virtual appliance) that is connected to the server. The deduplication engine includes a fingerprint generator 445, a fingerprint comparison module 450, and a mapping module 455. The storage includes one or more repositories or databases that store base data objects 460, base fingerprints 465, customer encrypted data objects 470, and fingerprints 475.

Base data objects typically include non-customer specific or publicly available data. For example, the base data objects can include operating system files, application binary files, device drivers, or other non-sensitive data. The base data objects may be referred to as reference data objects and are stored in an unencrypted format.

Fingerprint generator 445 is responsible for applying a fingerprint algorithm to the base data objects to generate base fingerprints. The fingerprint comparison module is responsible for comparing the base fingerprints and fingerprints received from the customers. The mapping module is responsible for mapping or associating a fingerprint associated with an encrypted data object from a customer to a base data object of a base fingerprint when there is a match between the base fingerprint and the fingerprint.

Figure 8:
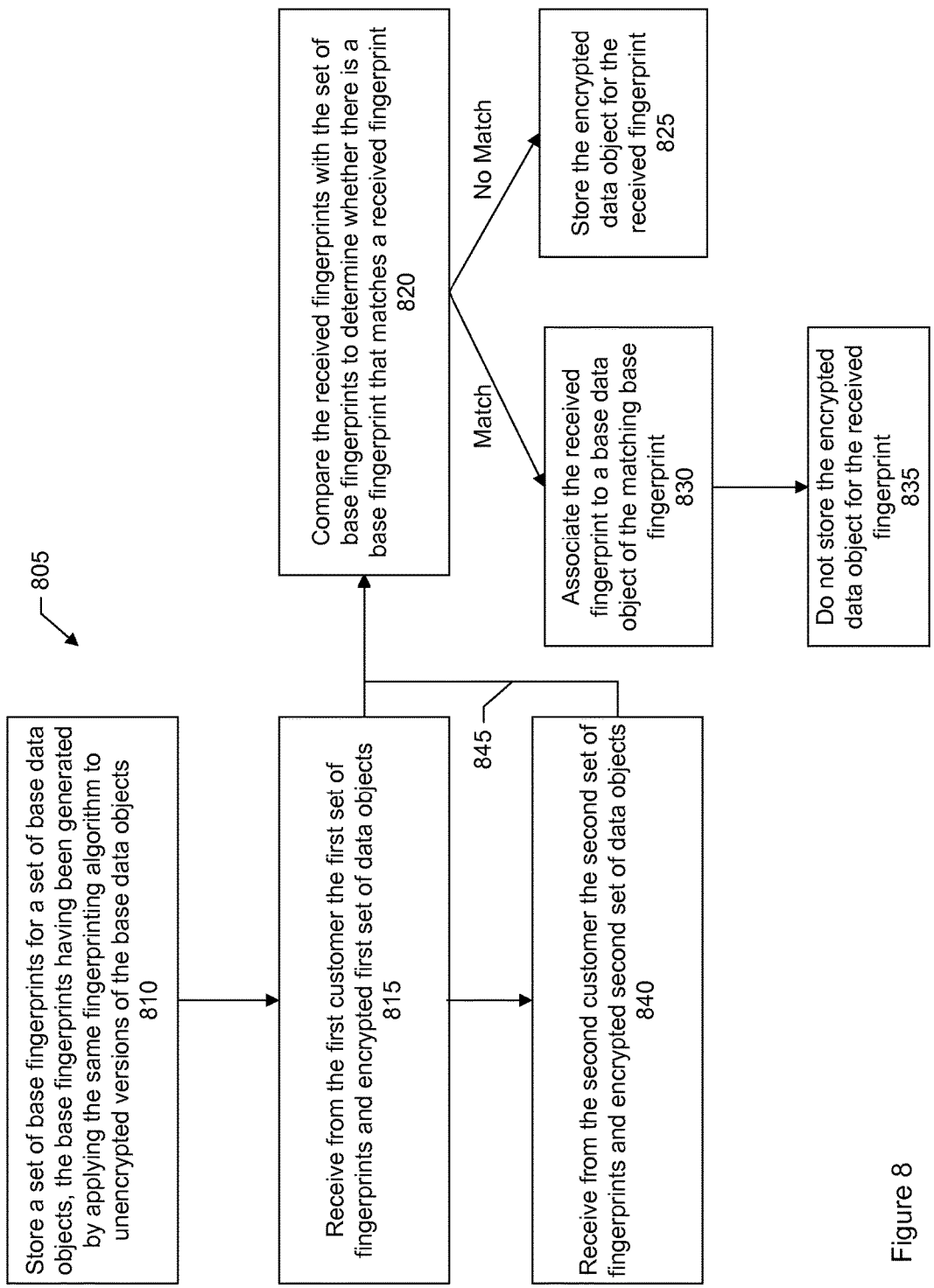
FIG. 8 shows a flow diagram for deduplicating encrypted data objects in a specific embodiment.

For example, FIG. 8 shows a flow 805 of a specific embodiment for deduplicating at the cloud storage system the encrypted data objects. In a step 810, a set of base fingerprints for a set of base data objects are stored at the cloud server. The base fingerprints are generated by applying a fingerprinting algorithm to unencrypted versions of the base data objects.

In this specific embodiment, the fingerprinting algorithm applied is the same as or is identical to the fingerprinting algorithm applied to the unencrypted versions of the data objects from the customers. For example, a fingerprint algorithm 480C (FIG. 4) used by fingerprint generator 445 of the cloud storage system will be the same as, identical to, or a copy of fingerprint algorithms 480A and 480B used by the customers.

In this specific embodiment, the cloud storage provider may store several release versions of popular operating systems files, images, application binary files along with configuration files in the cloud as objects. These objects are fingerprinted using an algorithm identical to that deployed in the backup gateway client. These objects, referred to as "base objects" are in an unencrypted format and are fingerprinted. The fingerprints may be referred to as "base fingerprints."

In a step 815, the cloud storage server receives from the first customer the first set of fingerprints and encrypted first set of data objects. In a step 820, the system compares the received fingerprints with the set of base fingerprints to determine whether there is a base fingerprint that matches a received fingerprint.

If there is not a match, in a step 825, the encrypted data object for the received fingerprint is stored at the cloud storage server. In other words, the encrypted data object associated with the received fingerprint is retained at the cloud storage server.

If, however, there is a match, in a step 830, the received fingerprint is associated with a base data object of the matching base fingerprint. The encrypted data object for the received fingerprint can then be disregarded, purged, or not stored at the cloud storage server (step 835). That is, the encrypted data object will be determined to be redundant, the base data object being identical to an unencrypted version of the encrypted data object.

More particularly, in a specific embodiment, there is a backup gateway client. The backup gateway client is situated on the premises of a customer using the cloud storage for storing backups. The client has or creates objects of the backup data to be stored in the cloud.

In this specific embodiment, the backup gateway client subsequently computes the fingerprint of the data objects before encrypting them and uses the fingerprints as a key to store and retrieve the backup data objects into/from the cloud storage. That is, the fingerprints are generated based on the data objects being in an unencrypted format. The fingerprints are generated while the data objects are in an unencrypted format.

Subsequently, the data object contents (not the fingerprints) are encrypted with a secret key (such that they cannot be decrypted by the cloud storage provider).

The collection of encrypted data objects and their respective fingerprints (which are unencrypted) are communicated to the cloud storage vendor. The fingerprint even though unencrypted is a hash of the object data and is computed such that the fingerprint itself cannot reveal the contents of the data object.

All communication (especially of the encrypted data objects and their respective plaintext fingerprints) between the gateway client and the cloud storage provider can be over a secure channel as an added level of protection. Some examples of secure channels include Secure Hypertext Transfer Protocol (SHTTP), IP Security (IPSec), Point-to-Point Tunneling Protocol (PPTP), and Layer 2 Tunneling Protocol (L2TP). Instead or additionally, the fingerprints may be encrypted using a shared key (i.e., a key that is shared between the customer and cloud storage provider).

The cloud storage provider checks whether the fingerprints of encrypted objects as supplied by the gateway client match any of the "base fingerprints."

If they do not match, the cloud storage provider, as per the object storage conventions implemented by the cloud storage vendor, stores the encrypted objects.

The cloud storage vendor can prepend the fingerprint supplied by the client gateway with a unique client/customer ID so as to make the fingerprint unique to each client/customer. This can be done transparently to the backup gateway client.

In a specific embodiment, the cloud storage vendor stores the fingerprint and the encrypted data object as a tuple such that the data object can be retrieved or managed or indexed on the fingerprint key. A tuple is an ordered set of values. It is a data structure that has a specific number and sequence of elements.

If, however, the fingerprints match, the cloud storage provider increases reference counts on the corresponding base object (if required). The reference variable can be used to track the number of references being made to a particular base object. If, for example, a backup is deleted, the reference variable may be decremented. The cloud storage provider can prepend the backup gateway supplied fingerprint with a unique client/customer ID and create a special mapping so that the fingerprint refers to its appropriate "base object" instead of the gateway client supplied object. The gateway client supplied object (encrypted) can be ignored, thrown away, or not stored by the cloud storage vendor.

In a step 840, encrypted data objects and associated fingerprints are received from other customers (e.g., second customer, third customer, fourth customer, and so forth). The fingerprint comparison process is then repeated 845 for each of the customers to deduplicate any redundant data objects by remapping their associated or corresponding fingerprints to base data objects.

Figure 9:
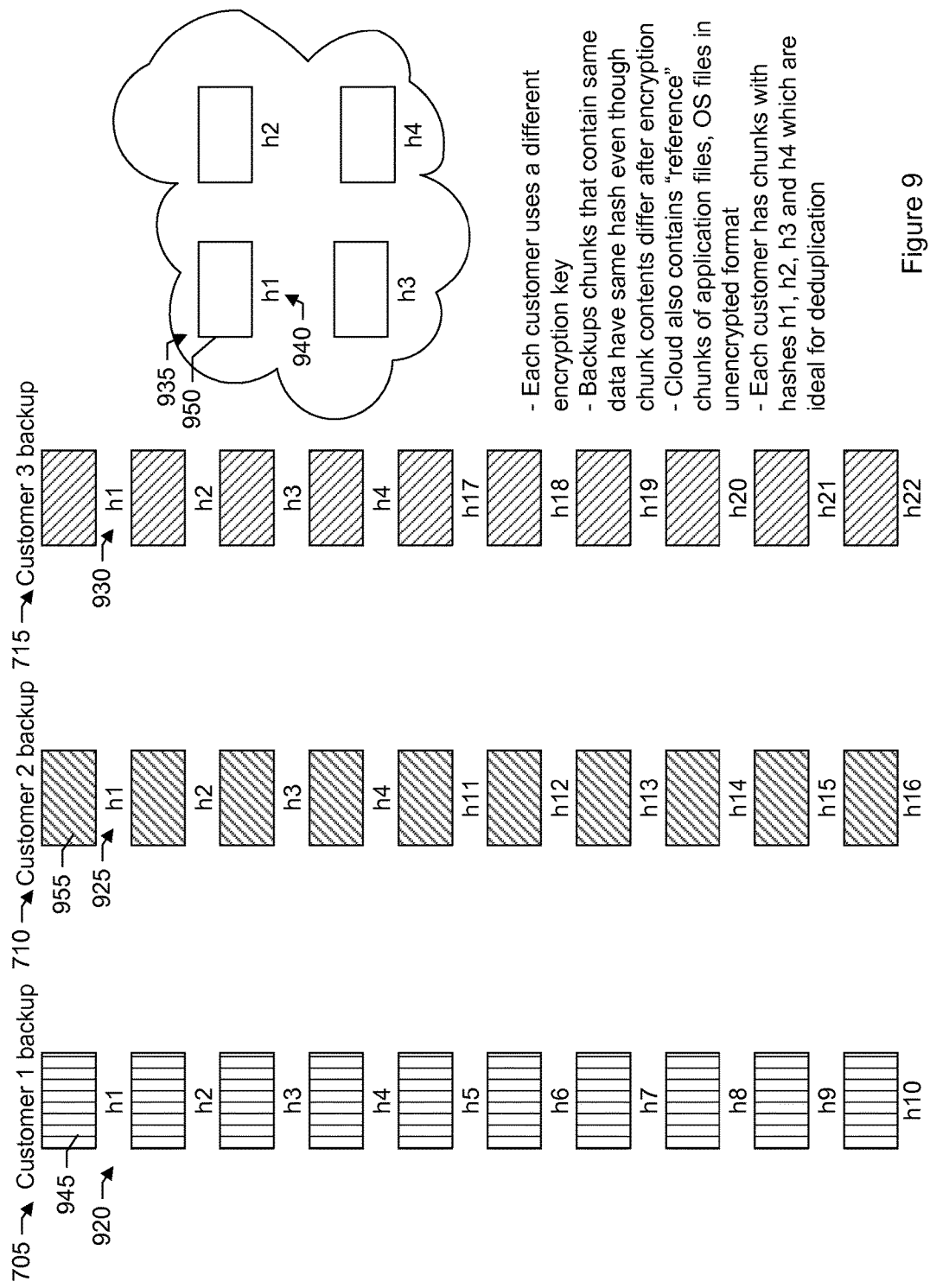
FIG. 9 shows an example of multiple customers backing up encrypted data objects to the cloud in a specific embodiment.

For example, as shown in FIG. 9, there are the encrypted first set of data objects 705 from the first customer, the encrypted second set of data objects 710 from the second customer, and the encrypted third set of data objects 715 from the third customer. The encrypted sets of data objects are associated with sets of corresponding fingerprints or hashes that have been calculated using unencrypted versions of the data objects.

In particular, the encrypted first set of data objects is associated with a first set of fingerprints or hashes 920 (e.g., h1-h10). The encrypted second set of data objects is associated with a second set of fingerprints or hashes 925 (e.g., h1-h16). The encrypted third set of data objects is associated with a third set of fingerprints or hashes 930 (e.g., h1-h22). Also shown in FIG. 9 is a set of base objects 935 and associated base fingerprints or hashes 940 (e.g., h1-h4).

As discussed above, in a specific embodiment, an encryption key is specific to a particular customer. Encrypting a data object using the first encryption key will result in a first encrypted data object. Encrypting another data object using the different second encryption key will result in a second encrypted data object. The first and second encrypted data objects will be different even if the two data objects (once unencrypted) are identical because the encryption keys are different.

In an embodiment, however, the encrypted data objects are accompanied by a set of fingerprints or hashes, e.g., h1-h22. These fingerprints or hashes were generated with the same or identical fingerprint algorithm and with unencrypted versions of the data objects. Thus, data objects or chunks that contain the same data will have the same fingerprint or hash even though the object or chunk contents will be different as a result of being encrypted using different keys.

In the example of FIG. 9, an encrypted first data object 945 from the encrypted first set of data objects will be determined to be a duplicate of a first base data object 950 because their associated fingerprints or hashes are matching—even though the data objects appear to be different because data object 945 is encrypted. In other words, the value of the fingerprint or hash associated with data object 945 matches or is the same as the value of the fingerprint or hash associated with base data object 950, i.e., h1=h1.

Likewise, an encrypted second data object 955 from the encrypted second set of data objects will be determined to be a duplicate of the first base data object 950 because their associated fingerprints or hashes are matching—even though the data objects (including data object 945) appear to be different because of the encryption. In other words, the value of the fingerprint or hash associated with data object 955 matches or is the same as the value of the fingerprint or hash associated with base data object 950, i.e., h1=h1.

Thus, in this example, the encrypted data objects associated with fingerprint or hash values h1, h2, h3, and h4 may be deduplicated.

Figure 10:
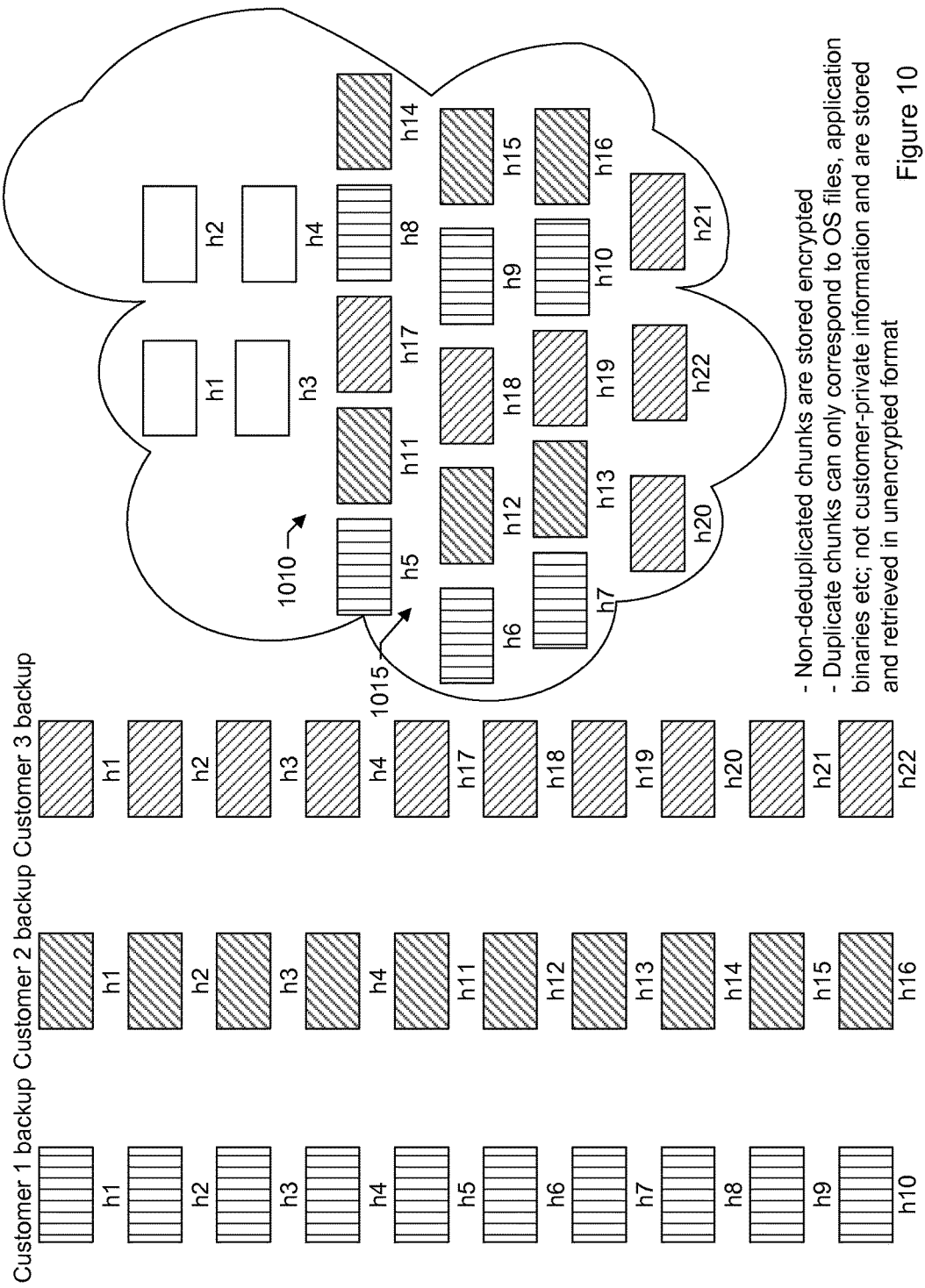
FIG. 10 shows an example of the data in the cloud having been deduplicated in a specific embodiment.

Encrypted data objects or chunks associated with fingerprints or hashes that do not match the base fingerprints will continue to be stored in an encrypted format. For example, as shown in FIG. 10, there is an encrypted set of data objects 1010 from the various customers having a set of associated fingerprints or hashes 1015 where the fingerprint or hash values (e.g., h5-h22) do not match the fingerprint or hash values (e.g., h1-h4) of the base data objects. Thus, data objects 1010 will be stored as received from the customers.

Figure 11:
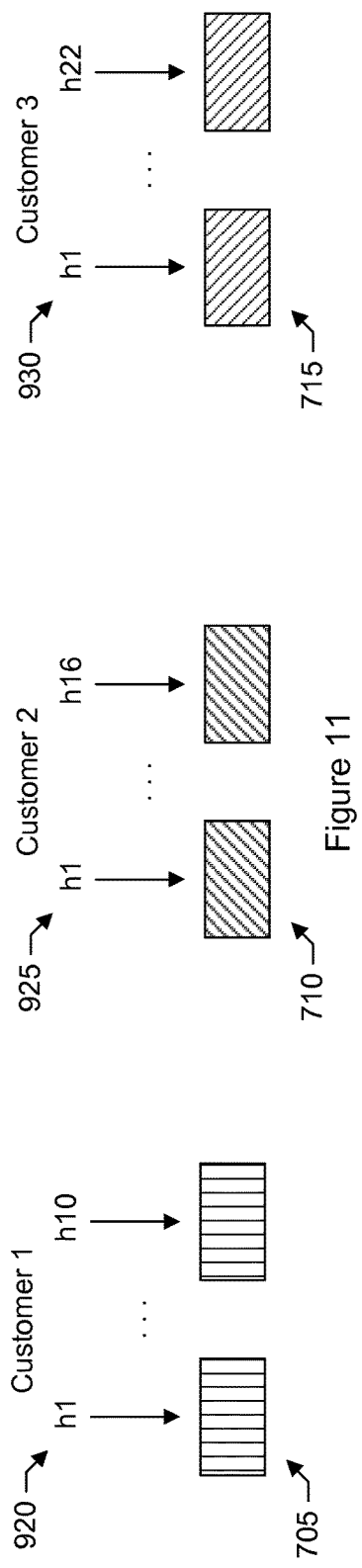
FIG. 11 shows an example of encrypted data objects before deduplication in a specific embodiment.
Figure 12:
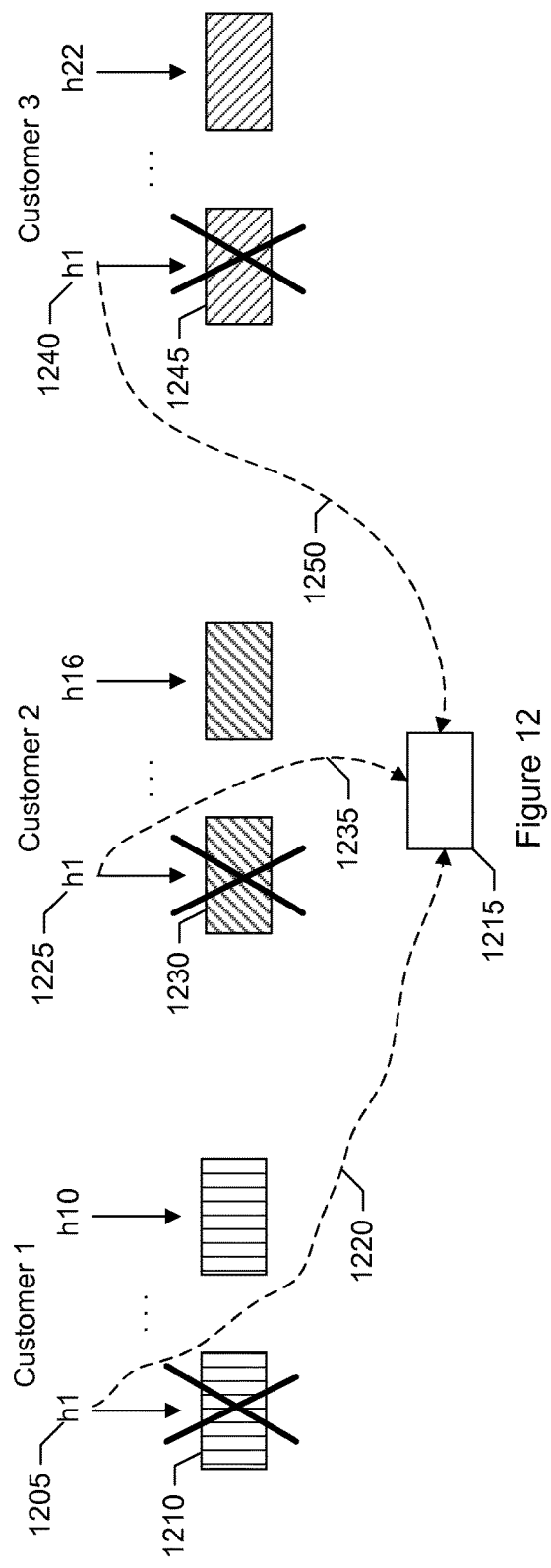
FIG. 12 shows an example of the encrypted data objects after deduplication in a specific embodiment.

FIGS. 11-12 show further examples of the deduplication process. In FIG. 11, the first customer has sent to the cloud server first set of fingerprints 920 that are associated with encrypted first set of data objects 705. The second customer has sent to the cloud server second set of fingerprints 925 that are associated with encrypted second set of data objects 710. The third customer has sent to the cloud server third set of fingerprints 930 that are associated with encrypted third set of data objects 715.

FIG. 12 shows a result of the deduplication. A fingerprint 1205 of the first set of fingerprints has been mapped (or remapped or re-associated) from an encrypted data object 1210 of the encrypted first set of data objects to a base data object 1215 as shown by a broken line 1220. Encrypted data object 1210 can then be deleted or purged from storage at the cloud server as shown by the "X" superimposed over data object 1210 in FIG. 12.

Similarly, a fingerprint 1225 of the second set of fingerprints has been mapped from an encrypted data object 1230 of the encrypted second set of data objects to the same base data object 1215 as shown by a broken line 1235. Encrypted data object 1230 can then be deleted or purged from storage at the cloud server as shown by the "X" superimposed over data object 1230 in FIG. 12.

And, a fingerprint 1240 of the third set of fingerprints has been mapped from an encrypted data object 1245 of the encrypted third set of data objects to the same base data object 1215 as shown by a broken line 1250. Encrypted data object 1245 can then be deleted or purged from storage at the cloud server as shown by the "X" superimposed over data object 1245 in FIG. 12. Thus, as shown in FIG. 12, different customers can have references, links, or pointers to the same base data object.

FIG. 13 shows an example of an entry 1305 that may be made in an index or table to track and retrieve a customer's encrypted data objects and any base data objects that have been used in deduplicating encrypted data objects. The entry may include a customer identifier 1310, a fingerprint 1315, and information 1320 that maps, references, links, points, or associates the fingerprint to an encrypted data object or an unencrypted base data object. FIG. 13 is merely an example of how encrypted data objects, base data objects, customers, and fingerprints can be tracked. For example, there can be a deduplication index. In this specific embodiment, an entry can be made in the deduplication index when an encrypted data object is determined to be identical to a base data object (i.e., the fingerprint of the data object in the decrypted or unencrypted format matches the fingerprint of the base data object). A separate index can be maintained for encrypted data objects that are not identical to any base data objects (i.e., the fingerprint of the data object in the decrypted or unencrypted format does not match any fingerprint of the base data objects).

FIG. 14 shows a flow diagram 1405 for retrieving or restoring data objects from the cloud server storage. In a step 1410, a request is received from a customer to retrieve an encrypted set of data objects that were sent to the cloud server for storage. The request includes a set of fingerprints associated with the encrypted set of data objects.

In a step 1415, a determination is made as to whether a fingerprint refers to a base data object. The determination may include scanning one or more index tables and, upon finding a matching entry via the fingerprint, examining mapping or location information to determine whether the fingerprint refers to an encrypted data object or a base data object.

If the fingerprint does not refer to a base data object, in a step 1420, the encrypted data object referred to by the fingerprint is transmitted from the cloud storage to the customer in response to the request.

If the fingerprint print refers to a base data object, in a step 1425, the base data object—and not the encrypted data object originally referred to by the fingerprint—is transmitted from the cloud storage to the customer in response to the retrieval request. In this case, the encrypted data object would have been deduplicated or would not have been stored or archived by the cloud storage system.

In other words, in a specific embodiment, when a backup gateway client wants to retrieve its backup objects, it passes the fingerprint key to retrieve its corresponding backup data object (encrypted).

The cloud storage provider checks (after prepending the fingerprint with the unique client/customer ID if applicable) whether the fingerprint refers to a "base object." If it does, the base object is communicated to the gateway client.

The cloud gateway can communicate the "base object" in unencrypted form over a secure communication channel or encrypt it using a key that is securely exchanged between the backup gateway client and the cloud storage provider.

If the base data object is returned (and not the encrypted data object) the cloud storage vendor can communicate to the backup gateway client that the object being returned is not the encrypted form of the object as was supplied by the backup gateway client. This helps to ensure that the client does not attempt to decrypt the base data object. Alternatively, if the base data object is encrypted with a shared key, the communication helps to ensure that the encrypted base data object is decrypted with the shared key and not the encryption key managed solely by the customer. For example, there can be flag or other attribute, setting, parameter, or property that accompanies the returned data object to indicate whether the data object is a base data object or an encrypted data object as provided by the client (or a copy of the encrypted data object).

Thus, in some cases, the client may transmit to the server an encrypted data object for storage at the server. The encrypted data object may be deduplicated and replaced with a base data object. The server, in response to the client requesting that the encrypted data object be restored, may transmit to the client the base data object and not the encrypted data object.

If the fingerprint as supplied by the backup gateway client (after prepending the fingerprint with the unique client/customer ID if applicable) does not refer to any "base object," the appropriate data object as was supplied by the backup gateway client is returned.

In this fashion, the cloud storage vendor can (optionally) implement deduped object storage across customers. Since the dedupe is applicable to only those "base objects" which are known to contain customer insensitive data, the resulting solution does not unduly reveal any secrets or infringe on the privacy of the customer data.

Further, the deduplication process can be enabled selectively for those clients/customers who elect to have it by choosing a particular class of storage service from the cloud storage provider. For example, in a specific embodiment, the system provides an option for a customer to select whether or not they wish to deduplicate. Some customers may elect not to deduplicate for reasons such as their corporate security policy and so forth. Other customers, however, may elect to deduplicate. Customers who elect to deduplicate may be charged less for storage as compared to customers who elect not to deduplicate. The system is flexible so that it can accommodate the requirements of both types of customers.

As discussed above, in a specific embodiment, deduplication is performed at the target server when the clients send both the encrypted data objects and associated fingerprints to the server for evaluation.

In another specific embodiment, the fingerprints—and not the encrypted data objects—are initially sent from the client to the server for evaluation. In this specific embodiment, the comparison module at the server compares a fingerprint against the base fingerprints. If there are no matches, the server makes a request for the client to send the encrypted data object associated with the fingerprint to the server for storage. Alternatively, if there is a match, the server associates the base data object having the matching base fingerprint to the fingerprint. Thus, computing resources such as network bandwidth can be conserved because encrypted data objects may be transmitted across the network only when there are no matching base fingerprints. In other words, in this specific embodiment, the client can send the fingerprint first and if the server responds to it by flagging the fingerprint as matching a base fingerprint, the client can skip sending the encrypted base object altogether.

In another specific embodiment, deduplication is performed at the source client. In this specific embodiment, there is a fingerprint comparison module at the client. The server sends the client the set of base fingerprints. The client, using the fingerprint comparison module, compares the base fingerprints and the fingerprints associated with the data objects the client wishes to back up. If a base fingerprint happens to match a fingerprint, a data object associated with the fingerprint does not have to be sent to the server. Rather, the client can provide an indication to the server to associate the fingerprint to the base data object referred to by the matching base fingerprint. Alternatively, if there are no matching base fingerprints, the client data object associated with the fingerprint can be sent to the server.

Factors that help determine whether to deduplicate at the client or the server include network bandwidth, network reliability, network availability, computing resources available at the server, computing resources available at the client, and others. For example, in some cases, a customer may wish to deduplicate at the source or client machine in order to avoid charges that may be incurred by using the computing resources of the cloud services provider. In other cases, a customer may wish to deduplicate at the target or server machine so that the source or client machine can be used for other computing tasks.

It should be appreciated that techniques such as compression may also be used to reduce the amount of network bandwidth required. For example, after a fingerprint of a data object has been generated, the data object may be compressed and then encrypted prior to sending the object to the server. Any appropriate compression technique may be used.

As stated previously, customers are increasingly using cloud storage to store their backup data. The backup data so stored can be stored as objects (e.g., S3 objects). There exists redundancy in backup data stored by customers. Some of it exists in the form of operating system files, images, application binaries, and configuration files, and so forth. These files as present in the backup often do not constitute customer-sensitive data and the same is publicly available. Since customer backup data is encrypted, it becomes difficult to exploit the redundancy and convert it into storage savings. Embodiments are directed to systems and techniques that can identify such data from within a customer's backup as what is publicly available and store it in a deduplicated format without having to decrypt the backup objects stored in the cloud.

In a specific embodiment, a method includes storing in a cloud storage system of a vendor a plurality of base fingerprints, each base fingerprint having a corresponding base data object of a plurality of base data objects, comparing a first fingerprint associated with a first data object of a first customer with the plurality of base fingerprints, if the first fingerprint matches a base fingerprint, associating the first fingerprint to a base data object of the base fingerprint, and not storing the first data object in the cloud storage system, and if the first fingerprint does not match the base fingerprint, storing the first data object in the cloud storage system, wherein the first data object is stored in a first encrypted format and the first fingerprint is calculated before the first data object is encrypted.

In another specific embodiment, there is a system for deduplicating, the system comprising a processor-based system executed on a computer system and configured to store in a cloud storage system of a vendor a plurality of base fingerprints, each base fingerprint having a corresponding base data object of a plurality of base data objects, compare a first fingerprint associated with a first data object of a first customer with the plurality of base fingerprints, if the first fingerprint matches a base fingerprint, associate the first fingerprint to a base data object of the base fingerprint, and not store the first data object in the cloud storage system, and if the first fingerprint does not match the base fingerprint, store the first data object in the cloud storage system, wherein the first data object is stored in a first encrypted format and the first fingerprint is calculated before the first data object is encrypted.

In another specific embodiment, there is a computer program product, comprising a physical non-transitory computer-readable medium having a computer-readable program code embodied therein, the computer-readable program code adapted to be executed by one or more processors to implement a method comprising storing in a cloud storage system of a vendor a plurality of base fingerprints, each base fingerprint having a corresponding base data object of a plurality of base data objects, comparing a first fingerprint associated with a first data object of a first customer with the plurality of base fingerprints, if the first fingerprint matches a base fingerprint, associating the first fingerprint to a base data object of the base fingerprint, and not storing the first data object in the cloud storage system, and if the first fingerprint does not match the base fingerprint, storing the first data object in the cloud storage system, wherein the first data object is stored in a first encrypted format and the first fingerprint is calculated before the first data object is encrypted.

Aspects of the system can be applied in enterprise-level multi-tenant environments. In a multi-tenant environment or architecture a single instance of the software runs on a server, serving multiple customer organizations (tenants). For example, data for multiple tenants may be stored in the same physical database object, however, tenant data typically is arranged so that data of one tenant is kept logically separate from that of other tenants. Thus, one tenant does not have access to another tenant's data. A multi-tenant environment is an example where there can be different customers with redundant data across the customers. A multi-tenant environment can be a good application for embodiments of the systems and techniques described herein.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
obtaining a plurality of base data objects comprising publicly available data including one or more of operating system files, or device drivers, and not including customer-generated data;
storing in a cloud storage system of a vendor a plurality of base fingerprints, each base fingerprint having a corresponding base data object of the plurality of base data objects, each base fingerprint having been calculated using a particular fingerprinting algorithm;
comparing a first fingerprint associated with a first data object of a first customer with the plurality of base fingerprints, the first fingerprint having been calculated using the same particular fingerprinting algorithm used to calculate the plurality of base fingerprints;
if the first fingerprint matches a base fingerprint,
  determining that the first data object of the first customer comprises publicly available data and not customer-generated data,
  associating the first fingerprint to a base data object of the base fingerprint, and
  not storing the first data object in the cloud storage system;
if the first fingerprint does not match the base fingerprint,
  determining that the first data object of the first customer comprises customer-generated data and not publicly available data,
  receiving, at the cloud storage system of the vendor, the first data object in a first encrypted format resulting from encryption of the first data object using a first encryption key, and
  storing the first data object in the cloud storage system, wherein the first data object is stored in the first encrypted format and the first fingerprint is calculated before the first data object is encrypted, wherein the first encryption key is managed by the first customer and not the vendor, and wherein the vendor is unable to decrypt the first data object;
determining that the first fingerprint matches the base fingerprint, associating the first fingerprint to the base data object, and not storing the first data object in the cloud storage system;
comparing a second fingerprint associated with a second data object of a second customer, different from the first customer, with the plurality of base fingerprints, the second fingerprint having been calculated using the same particular fingerprinting algorithm used to calculate the plurality of base fingerprints and the first fingerprint;
determining that the second fingerprint matches the base fingerprint; and
associating the second fingerprint to the base data object of the base fingerprint, and not storing the second data object in the cloud storage system, wherein the first data object of the first customer, and the second data object of the second customer comprise publicly available data and not customer-generated data.

2. The method of claim 1 comprising:
receiving at the cloud storage system a third fingerprint, and a third data object from the first customer, the third data object having been encrypted by the first customer using the first encryption key;
receiving at the cloud storage system a fourth fingerprint associated with a fourth data object from the second customer, the fourth data object having been encrypted by the second customer using a second encryption key, different from the first encryption key;
determining that the third and fourth fingerprints match the base fingerprint;
upon the determination, associating the third fingerprint to the base data object of the base fingerprint; and
upon the determination, associating the fourth fingerprint to the base data object of the base fingerprint, wherein the third and fourth fingerprints are generated using the same particular fingerprinting algorithm on unencrypted versions of the third and fourth data objects.

3. The method of claim 1 comprising:

receiving a request from the first customer to retrieve the first data object, the request comprising the first fingerprint; and transmitting in response to the request the base data object associated with the first fingerprint and not transmitting the first data object, the first data object not having been stored in the cloud storage system.

4. The method of claim 3 wherein the base data object is unencrypted and the method comprises transmitting in response to the request an indication that the base data object is unencrypted.

5. The method of claim 1 wherein the vendor does not have access to the first encryption key.

6. The method of claim 1 wherein the base data objects are stored in an unencrypted format.

7. A system for deduplicating, the system comprising:

a processor-based system, comprising a hardware processor, executed on a computer system and configured to:

obtain a plurality of base data objects comprising publicly available data including one or more of operating system files, or device drivers, and not including customer-generated data;

store in a cloud storage system of a vendor a plurality of base fingerprints, each base fingerprint having a corresponding base data object of the plurality of base data objects, each base fingerprint having been calculated using a particular fingerprinting algorithm;

compare a first fingerprint associated with a first data object of a first customer with the plurality of base fingerprints, the first fingerprint having been calculated using the same particular fingerprinting algorithm used to calculate the plurality of base fingerprints;

if the first fingerprint matches a base fingerprint, determine that the first data object of the first customer comprises publicly available data and not customer-generated data, associate the first fingerprint to a base data object of the base fingerprint, and not store the first data object in the cloud storage system;

if the first fingerprint does not match the base fingerprint, determine that the first data object of the first customer comprises customer-generated data and not publicly available data, receive, at the cloud storage system of the vendor, the first data object in a first encrypted format resulting from encryption of the first data object using a first encryption key, and store the first data object in the cloud storage system, wherein the first data object is stored in the first encrypted format and the first fingerprint is calculated before the first data object is encrypted, wherein the first encryption key is managed by the first customer and not the vendor, and wherein the vendor is unable to decrypt the first data object;

determine that the first fingerprint matches the base fingerprint, associate the first fingerprint to the base data object, and not store the first data object in the cloud storage system;

compare a second fingerprint associated with a second data object of a second customer, different from the first customer, with the plurality of base fingerprints, the second fingerprint having been calculated using the same particular fingerprinting algorithm used to calculate the plurality of base fingerprints and the first fingerprint;

determine that the second fingerprint matches the base fingerprint; and associate the second fingerprint to the base data object of the base fingerprint, and not store the second data object in the cloud storage system, wherein the first data object of the first customer, and the second data object of the second customer comprise publicly available data and not customer-generated data.

8. The system of claim 7 wherein the processor-based system is configured to:

receive at the cloud storage system a third fingerprint, and a third data object from the first customer, the third data object having been encrypted by the first customer using the first encryption key;

receive at the cloud storage system a fourth fingerprint associated with a fourth data object from the second customer, the fourth data object having been encrypted by the second customer using a second encryption key, different from the first encryption key;

determine that the third and fourth fingerprints match the base fingerprint;

upon the determination, associate the third fingerprint to the base data object of the base fingerprint; and upon the determination, associate the fourth fingerprint to the base data object of the base fingerprint, wherein the third and fourth fingerprints are generated using the same particular fingerprinting algorithm on unencrypted versions of the third and fourth data objects.

9. The system of claim 7 wherein the processor-based system is configured to:

receive a request from the first customer to retrieve the first data object, the request comprising the first fingerprint; and transmit in response to the request the base data object associated with the first fingerprint and not transmit the first data object, the first data object not having been stored in the cloud storage system.

10. The system of claim 9 wherein the base data object is unencrypted and the processor-based system is configured to transmit in response to the request an indication that the base data object is unencrypted.

11. The system of claim 7 wherein the vendor does not have access to the first encryption key.

12. The system of claim 7 wherein the base data objects are stored in an unencrypted format.

13. A computer program product, comprising a non-transitory computer-readable medium having a computer-readable program code embodied therein, the computer-readable program code adapted to be executed by one or more processors to implement a method comprising:

obtaining a plurality of base data objects comprising publicly available data including one or more of operating system files, or device drivers, and not including customer-generated data;

storing in a cloud storage system of a vendor a plurality of base fingerprints, each base fingerprint having a corresponding base data object of the plurality of base data objects, each base fingerprint having been calculated using a particular fingerprinting algorithm;

comparing a first fingerprint associated with a first data object of a first customer with the plurality of base fingerprints, the first fingerprint having been calculated using the same particular fingerprinting algorithm used to calculate the plurality of base fingerprints;

if the first fingerprint matches a base fingerprint,
- determining that the first data object of the first customer comprises publicly available data and not customer-generated data,
- associating the first fingerprint to a base data object of the base fingerprint, and
- not storing the first data object in the cloud storage system;

if the first fingerprint does not match the base fingerprint,
- determining that the first data object of the first customer comprises customer-generated data and not publicly available data,
- receiving, at the cloud storage system of the vendor, the first data object in a first encrypted format resulting from encryption of the first data object using a first encryption key, and
- storing the first data object in the cloud storage system, wherein the first data object is stored in the first encrypted format and the first fingerprint is calculated before the first data object is encrypted, wherein the first encryption key is managed by the first customer and not the vendor, and wherein the vendor is unable to decrypt the first data object;

determining that the first fingerprint matches the base fingerprint, associating the first fingerprint to the base data object, and not storing the first data object in the cloud storage system;

comparing a second fingerprint associated with a second data object of a second customer, different from the first customer, with the plurality of base fingerprints;

determining that the second fingerprint matches the base fingerprint; and associating the second fingerprint to the base data object of the base fingerprint, and not storing the second data object in the cloud storage system.

14. The computer program product of claim 13 wherein the method comprises:

- receiving at the cloud storage system a third fingerprint, and a third data object from the first customer, the third data object having been encrypted by the first customer using the first encryption key;
- receiving at the cloud storage system a fourth fingerprint associated with a fourth data object from the second customer, the fourth data object having been encrypted by the second customer using a second encryption key, different from the first encryption key;
- determining that the third and fourth fingerprints match the base fingerprint;
- upon the determination, associating the third fingerprint to the base data object of the base fingerprint; and
- upon the determination, associating the fourth fingerprint to the base data object of the base fingerprint, wherein the third and fourth fingerprints are generated using the same particular fingerprinting algorithm on unencrypted versions of the third and fourth data objects.

15. The computer program product of claim 13 wherein the method comprises:
- receiving a request from the first customer to retrieve the first data object, the request comprising the first fingerprint; and
- transmitting in response to the request the base data object associated with the first fingerprint and not transmitting the first data object, the first data object not having been stored in the cloud storage system.

16. The computer program product of claim 15 wherein the method comprises transmitting in response to the request an indication that the base data object is unencrypted.

17. The computer program product of claim 13 wherein the publicly available data at the cloud storage system of the vendor is stored in an unencrypted format and the customer-generated data is stored in an encrypted format at the cloud storage system of the vendor.

* * * * *